United States Patent [19]

Hall

[11] Patent Number: 5,001,958
[45] Date of Patent: Mar. 26, 1991

[54] APPARATUS FOR PREPARING SKIVED BELTING

[76] Inventor: Richard D. Hall, 2 River Ridge Rd., Dayton, Mass. 04005

[21] Appl. No.: 320,461

[22] Filed: Mar. 8, 1989

[51] Int. Cl.$^5$ .............................................. B27B 17/02
[52] U.S. Cl. ........................................ 83/875; 83/745; 83/794; 83/809; 83/821; 30/372; 30/377; 30/386
[58] Field of Search ................... 83/574, 745, 796, 794, 83/798, 799, 809, 797, 821; 30/371, 372, 382, 381, 383, 386, 377

[56] References Cited

U.S. PATENT DOCUMENTS

| | | | |
|---|---|---|---|
| 3,051,203 | 8/1962 | Hayden | 143/32 |
| 3,864,830 | 2/1975 | Haddon | 30/371 |
| 4,063,358 | 12/1977 | Hodge | 30/371 |
| 4,315,450 | 2/1982 | Pray | 83/862 |
| 4,453,438 | 6/1984 | Zelli | 83/745 |
| 4,476,759 | 10/1984 | Aderneck | 83/745 |
| 4,611,521 | 9/1986 | McCardle | 83/796 |
| 4,656,910 | 4/1987 | Peterson | 83/875 |
| 4,726,274 | 2/1988 | Pitoni et al. | 83/745 |
| 4,757,735 | 7/1988 | Olson | 83/574 |
| 4,821,415 | 4/1989 | Kress | 30/383 |
| 4,856,394 | 8/1989 | Clowers | 30/377 |
| 4,858,318 | 8/1989 | Anderson | 30/383 |

OTHER PUBLICATIONS

Belt Maintenance Tools, Flexco/Alligator Countersinking Tools, Catalog of Flexible Steel Lacing Co., Copyright 1986.

Primary Examiner—Frank T. Yost
Assistant Examiner—Scott A. Smith
Attorney, Agent, or Firm—Lahive & Cockfield

[57] ABSTRACT

A method and apparatus for preparing skived belting ends for joining by means of fasteners, and like products. A guide block is temporarily fastened across the width of the belting, serving as a guide for a chain saw tool. A first side edge portion of the tool slidably engages the guide block while permitting the cutting plane to be transverse to the direction of said width and intersecting with the belting surface to skive it. Thereafter, a second side edge portion of the tool slidably engages the guide block while permitting the cutting plane to be parallel to the direction of said width and intersecting with the belting to cut off an end thereof.

8 Claims, 2 Drawing Sheets

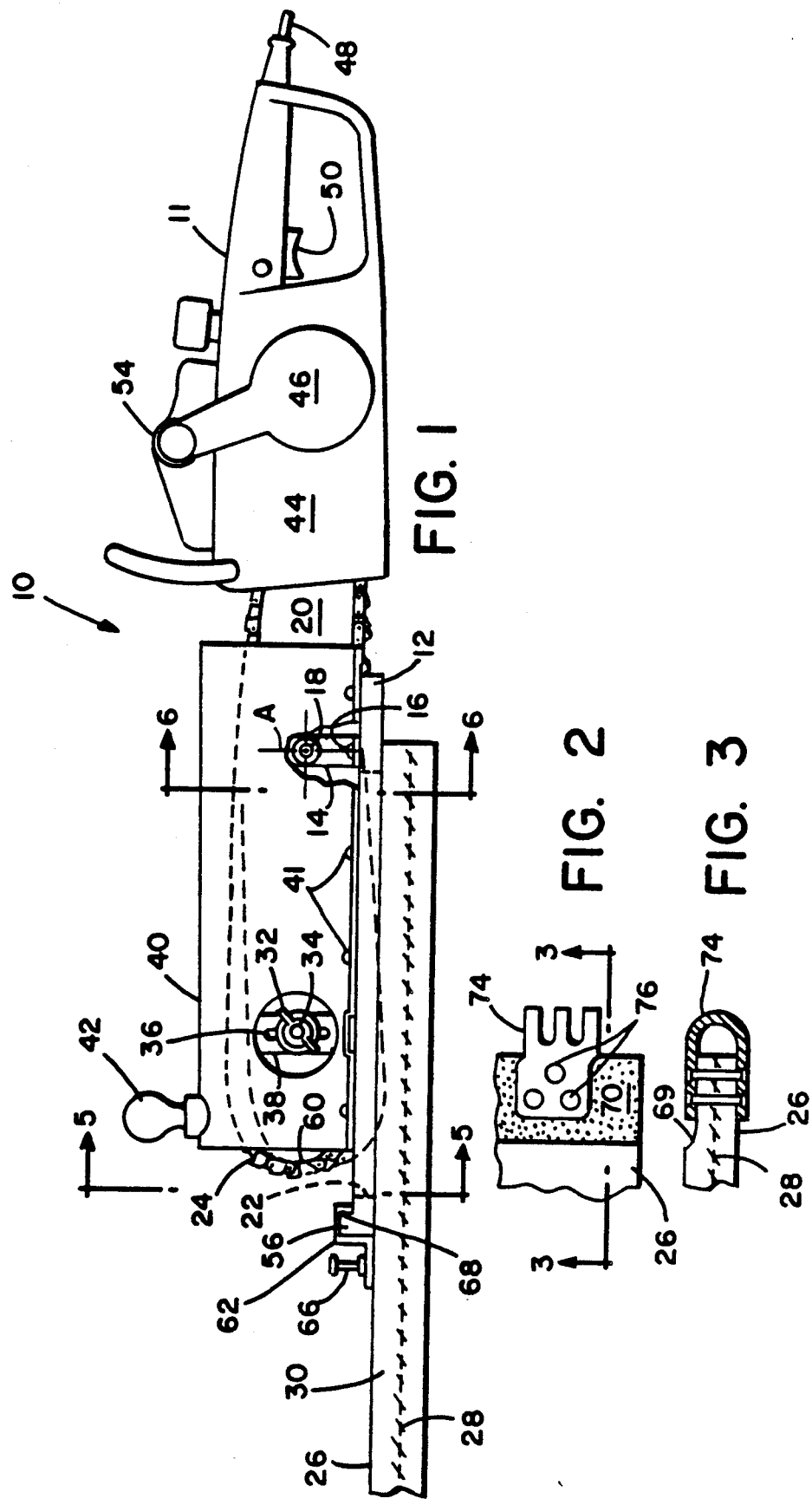

APPARATUS FOR PREPARING SKIVED BELTING

SUMMARY OF THE INVENTION

This invention relates generally to a method and tool for preparing skived belting and the like. More particularly, it relates to a compact and portable tool adapted for accurately skiving a portion of a belt cover and optionally cutting off an end of the belt in preparation for attachment of a recessed fastener or fasteners to form a splice or loop.

While the tool of this invention has other applications, a use of particular importance is the preparation of the ends of belting used in industry for conveying materials or delivering power. Such belting is constructed of a variety of materials, usually including a carcass of strong woven fibers or the like coated with a cover of appropriate thickness, the cover comprising rubber or rubber-like materials, polyurethane, polyvinylchloride or other flexible synthetic compositions. Belting is commonly supplied in rolls which may be up to several feet in width depending on the application. A measured length of belting is cut from the roll and fasteners are applied to the ends for joining them to form a splice or closed loop.

Belt fasteners of various types are available, and the choice depends upon such factors as the construction of the belting carcass and cover, the radii of roll and pulley curvatures and the clearances between the belting surface and doctor blades, plows or the like. If the fasteners comprise plates attached on the surface of the belt cover, the plates may project objectionably into such clearances, and in such cases it is desirable to skive the belting so that the plates may be recessed relative to its surface.

In many industrial applications the wearing out or failure of belting during production results in serious loss of production time and consequent large economic loss. This arises from the necessity to stop equipment, to provide trained maintenance personnel and tools for preparing skived belting ends, and to set up and operate the tools, usually at the locale of the equipment, and at a speed consistent with the accuracy required for proper mounting of the plates or other fasteners.

In practice, belting has been skived by several different methods with varying results. One method is to grind off a measured thickness of the belting cover by means of an abrasive wheel. A second method is to employ a routing tool to form a recess or recesses in the belting cover. A third method is to guide a skiving cutter blade across the width of the belting either by hand or with the aid of a winch as disclosed in the Pray U.S. Pat. No. 4,315,450, dated Feb. 16, 1982.

While each of the foregoing methods has certain advantages for particular types of belting, its use is less satisfactory for other beltings and locations of use. In some cases available skiving tools can be properly operated only by following complex instructions, and appropriate training must be provided for maintenance personnel. In some cases the skiving tools are slow in operation and may take up to several hours to prepare the belting ends, idling an entire production line at possibly great cost. The speed of the skiving tool may be affected by the tendency of rubber to melt and to fill the tool surface with fines. Where the fasteners are to be applied to the belting by rivets, nuts and bolts, staples or other fasteners, the operation of tools that tend to cut into the fastener area may result in loss of power in the fasteners and consequent loss of strength in the splice.

A principal object of this invention is to provide a method and apparatus for preparing skived belting ends rapidly, with compact and readily portable equipment and with a minimum of training and skill.

A related object is to provide a method and tool that are adapted for both skiving and cutting off the belt ends.

A further object is to provide a tool that produces a straight cut that is square with the belting sides.

With the foregoing and other objects hereinafter appearing in view, the features of this invention include the use of a chain saw tool constructed and adapted to skive a measured portion of the belting cover with precision and at a rapid speed, minimizing the down time of the machine or production line in which the belting is installed.

According to the invention, a single piece or segmented guide block is temporarily secured across the width of the belting, and the chain saw tool is then slidably guided along the guide block while restraining its cutting plane to be transverse to the direction of said width and intersecting with the belting surface to skive it.

Following the skiving pass, the chain saw tool is then turned and slidably guided along the guide block while restraining its cutting plane to be parallel to the direction of the belting width and intersecting with the belting to cut off an end portion, whereby the end remaining comprises a skived margin of predetermined dimensions suitable for attachment of a fastener or fasteners.

The chain saw tool comprises a guide plate, a conventional chain saw having a guide bar for the cutting chain, and means for pivotally supporting the guide bar on the guide plate to extend in a direction toward an edge portion of the guide plate. This edge portion is formed for slidably cooperating with the guide block to maintain the chain in proper orientation for skiving the belting cover.

Preferably, the guide plate is provided with a second edge portion slidingly cooperable with the guide block in a second orientation of the chain saw tool to cut off the belting end along an accurately predetermined line square with the sides of the belting.

Other features of the invention will be evident from the following description of a preferred embodiment.

BRIEF DESCRIPTION OF THE DRAWINGS

FIG. 1 is a side elevation of the presently preferred form of skiving tool according to the invention.

FIG. 2 is a fragmentary plan view of the belting after it has been skived and cut off and a fastener applied.

FIG. 3 is an elevation in section taken on line 3—3 of FIG. 2.

DETAILED DESCRIPTION

Figure 6:
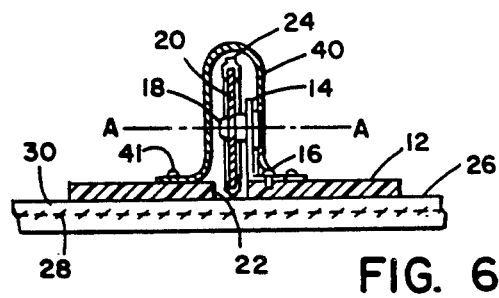
FIG. 6 is an elevation in section taken on line 6—6 of FIG. 1.
Figure 5:
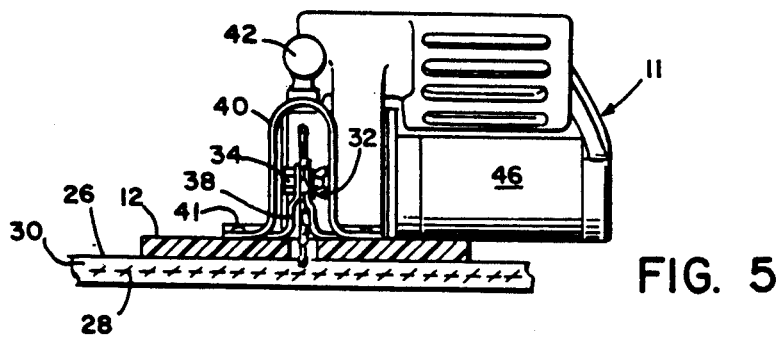
FIG. 5 is a front elevation taken on line 5—5 of FIG. 1.

Referring to the drawings, the presently preferred embodiment of the tool according to this invention is shown at 10 and includes a chain saw 11 of conventional construction. The chain saw is pivotally mounted on a flat guide plate 12 by means of a bracket 14 (FIGS. 1 and 6), the bracket being secured to the guide plate by a screw 16 or other suitable fasteners. A pivot pin 18 passes through round holes in the bracket and a guide bar 20 forming part of the chain saw.

The guide plate has a thru slot 22 permitting the guide bar and an endless cutting chain 24 thereon to pass through the slot into contact with a belt 26.

Typically, the belt 26 has a carcass 28 comprising one or more layers of strong woven, fibrous material with covering portions 30 of rubber, rubber-like or plastic, flexible material.

The depth to which the chain 24 penetrates the cover 30 is adjustable by means of a wing nut 32 and screw 34 passing through a vertical slot 36 in a bracket 38 secured to the guide plate 12, the screw 34 also passing through a round hole in the guide bar 20.

For safety in operation the portion of the chain saw comprising the guide bar and chain is substantially surrounded by a cover 40 attached by screws 41 to the guide plate 12. A handle 42 is attached to the cover adjacent the outer end of the guide bar 20.

As stated above, the chain saw 11 is of conventional construction and comprises a body 44 to which the inner end of the guide bar 20 is rigidly secured, and a motor 46 shown in this embodiment as an electrical motor powered through a cord 48 under the control of a trigger switch 50. A handle 54 extends from the body over the motor 46.

The guide bar 20 pivots on the axis A—A of the screw 18 which is located intermediate between the inner and outer ends of the guide bar 20. The guide plate 12 has an integral upwardly projecting rail 56 extending along one edge in parallel to the axis A—A and perpendicularly to the direction of extent of the guide bar 20.

The guide plate also has an integral upwardly projecting rail 58 extending along a second edge perpendicularly to the rail 56 and parallel to the direction of extent of the guide bar 20. The outer end of the guide bar 20 and chain is spaced from the rail 56 as shown.

In addition to the tool 10, a guide block 62 is provided. The guide block is of sufficient length to extend entirely across the width of the belting 26, and may be a single piece or may be of segmented construction. The form shown comprises a plurality of segments fitted together end-to-end by means of mutually fitting circular projections and apertures 64. In use, the guide block is placed on the belting 26, squared with the edge of the belting and temporarily secured thereto by any suitable means such as duplex nails 66.

The guide block 62 is formed with a downwardly facing channel 68 having a sliding fit with each of the rails 56 and 58. The channel 68 prevents the guide plate 12 from drifting away from or at an angle to the guide block 62 during the skiving and cutting movements.

The structures described above are of simplified form and are required to occupy substantially no more space for transport than that occupied by the chain saw itself. In embodiments employing a segmented guide block, the length of each of the segments is preferably not greater than that of the chain saw 11, so that all of the necessary elements for preparing the belting may be transported in a box or container having a maximum dimension of the order of two feet.

In operation, the guide block 62 is temporarily secured by the duplex nails 66 to the belting 26 across its width after being squared to the edge of the belting. Then, the rail 56 on the guide plate 12 of the tool 11 is fitted into the channel 68 at one edge of the belting to orient the tool in firm sliding contact with the guide block. The wing nut 32 is loosened and the chain saw pivoted about the axis A—A until the chain 24 projects the desired distance below the lower surface of the guide plate 12, corresponding to the desired depth of penetration of the skive in the belting cover 30.

The chain saw is then guided slidably along the guide block across the width of the belt to skive it. In this operation the belt cover material is rapidly and efficiently removed and the belt is skived with a radius 69 (FIG. 3) corresponding to the curvature of the cutting chain 24 as it passes around the outer end of the guide bar 20, the skived area being shown at 70 in FIGS. 2 and 4.

Figure 4:
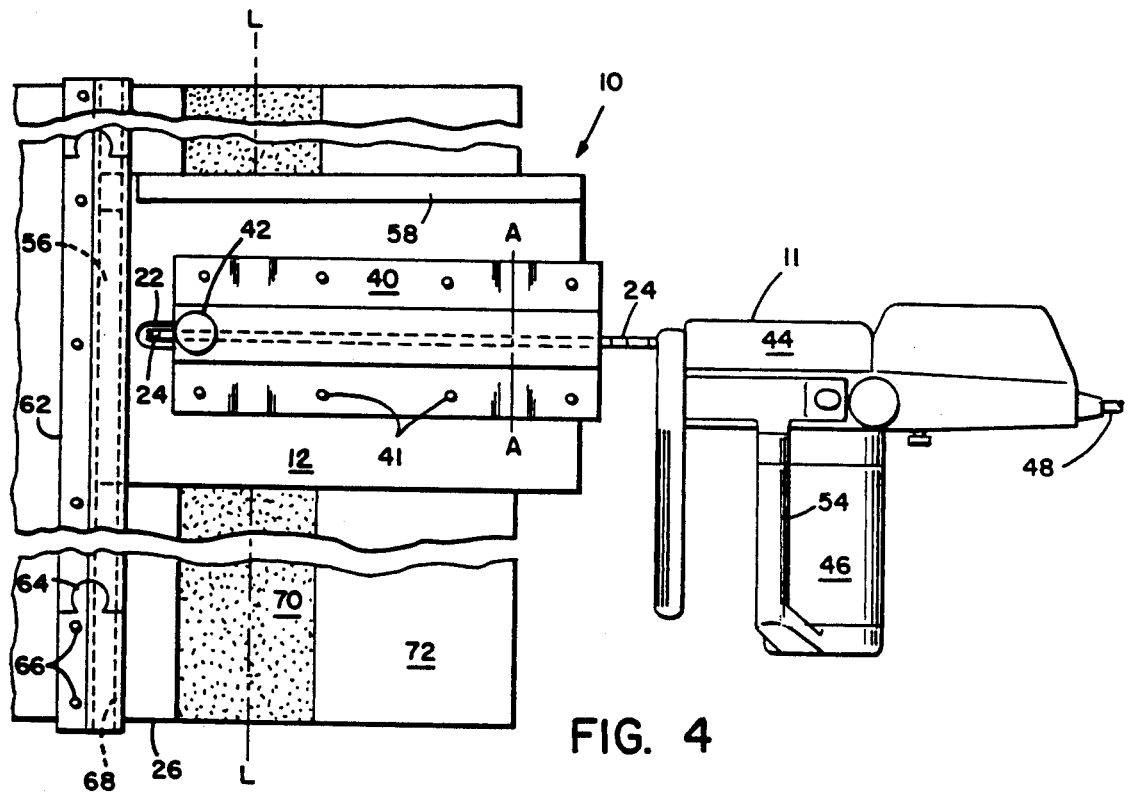
FIG. 4 is a view in plan of the tool shown in FIG. 1.

After the belting has been skived as described above, if a loop or splice is to be formed the tool 11 is turned at right angles to the position shown in FIG. 4 relative to the belting, and the rail 58 of the guide plate 12 is fitted into the channel 68 in firm sliding contact with the guide block 62. The wing nut 32 is readjusted to permit the chain 24 to penetrate the full thickness of the belting 26, and the tool is moved across the width of the belt in sliding contact with the guide block 62, severing the belt along a line L—L. The location of the line L—L along which the belting is cut relative to the location of the skived area 70 is predetermined by the distances between the chain 24 and the respective rails 56 and 58 on the guide plate, as shown.

If a closed loop is to be formed, the opposite end of the belting is similarly skived and cut off, leaving a loop of the exact length required. Alternatively, if a splice is desired an end of the adjacent length of belting is similarly prepared.

FIGS. 2 and 3 illustrate the application of a typical conventional fastener 74 to the skived area 70 of the belting. Rivets 76 or other suitable devices secure the fastener to the belting so that the fastener preferably does not project above the surface thereof.

If desired, calibrations may be provided on the bracket 38 or the cover 40 to register with a mark or marks on the guide bar 20 or parts attached to the guide bar, to adjust the depth of penetration of the cutting chain into the cover 30 of the belting.

Although the invention has been described as applied to the preparation of skived belting for splicing or fastening together its ends or adjacent pieces of belting, it may have other applications. For example, it may be used to form grooves across a belt at any position or positions along its length to form negative cleats for retaining or restraining conveyed objects or materials, for example on inclined belts where the conveyed products are wet or slippery. The tool is also useful for employing a chain saw as a planing device, to create a radius on a work piece and to cut thick sheet rubber.

I claim:

1. A tool for preparing skived belting and like products comprising, in combination, a guide plate having upper and lower sides, the lower side having a surface adapted for sliding contact with a workpiece, said guide plate also having an edge portion and an elongate thru slot communicating between said sides and extending in a direction toward said edge portion, a chain saw comprising a body, a guide bar having an inner end secured to the body and extending to an outer end remote from the body, a chain on the guide bar and a motor drivingly coupled to the chain, a bracket pivotally supporting the guide bar on the guide plate about an axis adjacent said inner end, and pivotal from a position with the full length of the guide bar on said upper side to a position with said outer end extending through the slot into contact with the workpiece, and a guide means secured to the workpiece, said guide plate edge portion having means cooperating with said guide means to guide said guide plate along said workpiece in a direction generally transverse to the cutting plane of said chain saw.

2. A tool according to claim 1, in which said outer end is spaced from said edge portion.

3. A tool according to claim 1, including means to limit the extent of the pivotal movement of the guide bar relative to the guide plate.

4. A tool according to claim 1, in which said axis is intermediate between the inner and outer ends of the guide bar.

5. A skiving and cutoff tool for belting and like products comprising, in combination, a guide plate having upper and lower sides, the lower side having a surface adapted for sliding contact with a workpiece, said guide plate also having a pair of edge portions forming a right angle and an elongate thru slot communicating between said sides and extending in a direction toward one of said edge portions, a chain saw comprising a body, a guide bar having an inner end secured to the body and extending to an outer end remote from the body, a chain on the guide bar and a motor drivingly coupled to the chain, a bracket pivotally supporting the guide bar on the guide plate about an axis adjacent said inner end with the guide bar extending parallel to the other of said edge portions and pivotal from a position with the full length thereof on said upper side to a position with said outer end extending through the slot into contact with the workpiece, and a guide means secured to the workpiece, said one of said edge portions having means cooperating with said guide means to guide said guide plate along said workpiece in a direction generally transverse to the cutting plane of said chain saw.

6. A tool according to claim 5, in which the guide bar is flat and said axis is perpendicular to said other edge portion.

7. A tool according to claim 5, in which said outer end is spaced from said edge portions.

8. A tool according to claim 5, including means to limit the extent of the pivotal movement of the guide bar relative to the guide plate.

* * * * *

UNITED STATES PATENT AND TRADEMARK OFFICE
CERTIFICATE OF CORRECTION

PATENT NO. : 5,001,958
DATED : March 26, 1991
INVENTOR(S) : Richard D. Hall

It is certified that error appears in the above-identified patent and that said Letters Patent is hereby corrected as shown below:

On the title page, in item [76]:
In the address of inventor, cancel "Mass." and substitute --Maine--

Signed and Sealed this

Twenty-eighth Day of July, 1992

Attest:

DOUGLAS B. COMER

*Attesting Officer*      *Acting Commissioner of Patents and Trademarks*